United States Patent [19]

Nowak

[11] Patent Number: 4,939,758
[45] Date of Patent: Jul. 3, 1990

[54] APPARATUS FOR THE GENERATION OF TOMOGRAPHIC X-RAY IMAGES

[75] Inventor: Kurt Nowak, Zemendorf, Austria

[73] Assignee: Art Bickford & Co., Weiner Neustadt, Austria

[21] Appl. No.: 243,554
[22] PCT Filed: Sep. 29, 1987
[86] PCT No.: PCT/AT87/00004
§ 371 Date: Jul. 27, 1988
§ 102(e) Date: Jul. 27, 1988
[87] PCT Pub. No.: WO87/04830
PCT Pub. Date: Aug. 13, 1987

[30] Foreign Application Priority Data

Jan. 30, 1986 [AT] Austria .................................. 227/86

[51] Int. Cl.$^5$ ............................................. H05G 1/64
[52] U.S. Cl. ............................................. 378/22; 378/62; 378/99; 358/111
[58] Field of Search .................... 358/111; 378/98–99, 378/21–27, 62

[56] References Cited

U.S. PATENT DOCUMENTS 4,079,417 3/1978 Scudder, III .
4,379,329 4/1983 Lemay .
4,516,261 5/1985 Harding et al. ........................ 378/25

FOREIGN PATENT DOCUMENTS 2020939 11/1979 United Kingdom .

OTHER PUBLICATIONS

"Image Enhancement of Conventional Transverse-Axial Tomagrams", *IEEE Transactions on Biomedical Engineering*, Strohbehn et al., vol. BME-26, No. 5, May 1979, pp. 253–262.

*Primary Examiner*—Carolyn E. Fields
*Assistant Examiner*—David P. Porta
*Attorney, Agent, or Firm*—Townsend & Townsend

[57] ABSTRACT

An apparatus for obtaining tomographic X-ray images having enhances contrast properties comprising an X-ray radiation receiver (3). The radiation is received by a recording circuit (50) having an analog-digital converter (4) and two memories (8, 9) for storage of the image signals. The image signals are recorded during two movement cycles of the X-ray source (1), preferably perpendicular to each other. An analyzing circuit (51) is connected to the two memories. A contrast comparison is repeated over a plurality of original images made between image elements adjacent each other. The result of this comparison is used for improvement of the original images with respect to the contrast in a transformation circuit (52), the improved images being visible on a monitor (43).

12 Claims, 5 Drawing Sheets

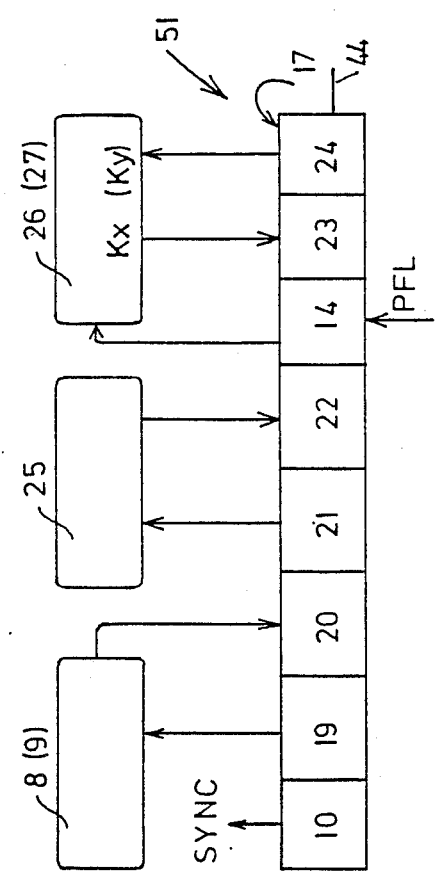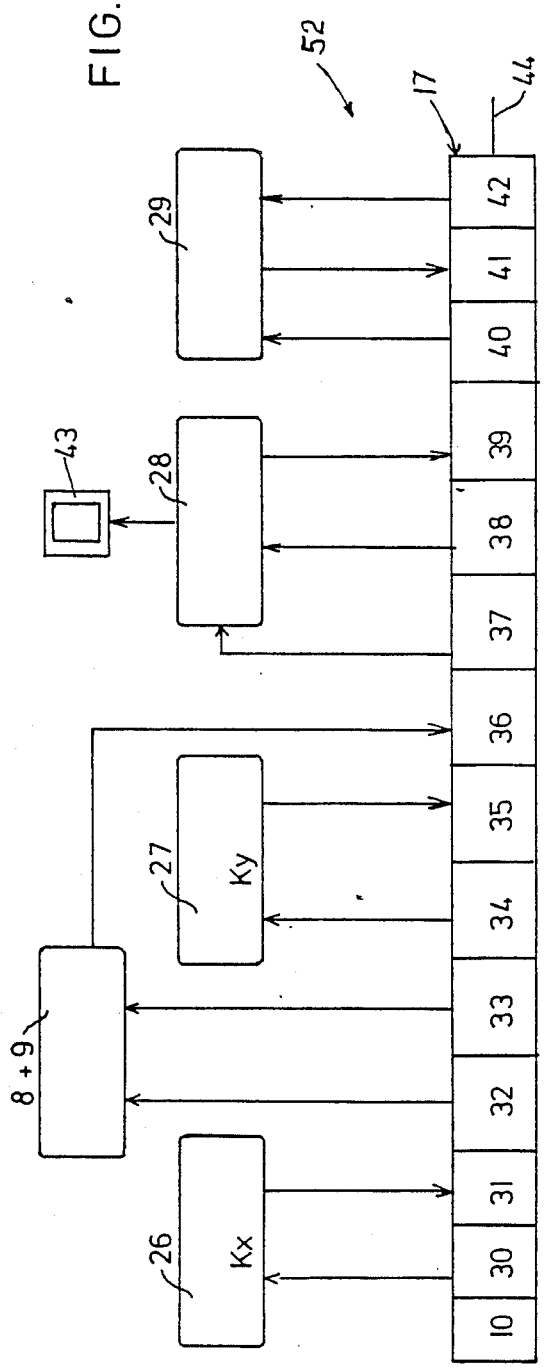

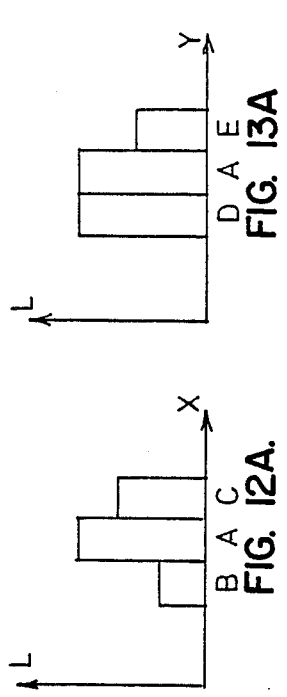
FIG. 12A.
FIG. 12B
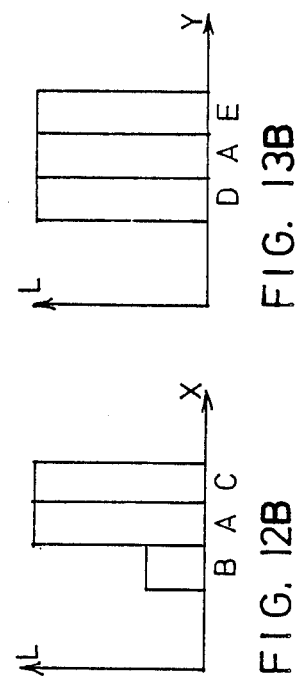
FIG. 13A
FIG. 13B
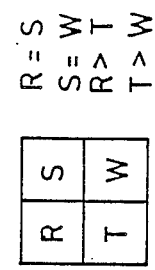
R = S
S = W
R > T
T > W
FIG. 14
FIG. 8A
I
FIG. 8B
II
FIG. 10
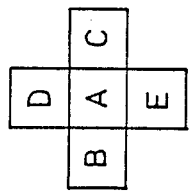
FIG. 9
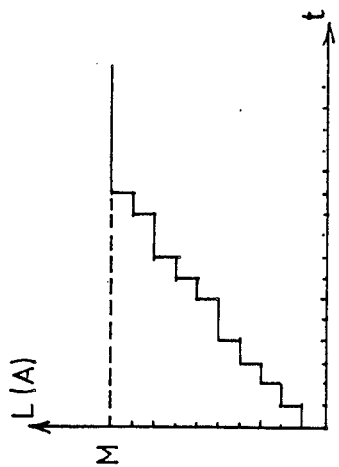
FIG. 11

APPARATUS FOR THE GENERATION OF TOMOGRAPHIC X-RAY IMAGES

BACKGROUND OF THE INVENTION

The invention relates to an apparatus for the generation of tomographic X-ray images having enhanced contrast properties. The radiation of an X-ray source is received by a receiver after having passed the object and is converted by an image converter into electrical image signals original images correspond element-by-element to the X-ray radiation. Signals are conducted by an electronic circuit to an image display device, for example, a monitor. Mechanical means produce a tomographic relative movement between the receiver and the X-ray source during the radiation.

As it is well known, single body layers can be displayed by tomographic methods of X-ray images, the depth and thickness of each body layer being selectable all other body layers are displayed out of focus. Usually, layers parallel to the longitudinal axis of the body (object) are recorded. It is of disadvantage within the known recording processes that the interference of contrasts by shadows of other layers cannot be fully avoided. In other words, layers not belonging to the recordal plane, if the diameter of these shadows is bigger than the movment range of the mechanical system used for the tomographic movement are displayed. Even smaller disturbing shadows are displayed in the form of smudges distorting the real picture, if any part of the contour of the shadow presents a curve similar to that of the tomographic movement. Therefore, the contrast and the resolution of the images produced by the known apparatus are not satisfactory. There have been attempts to avoid these disadvantages by complicated tomographic movements, but the desired success has not been reached. In addition, the known methods suffer from the disadvantage that the X-ray doses is comparatively high. This occurs because, when recording, radiographic radiation rates must be used. These disadvantages also result for the known method of computer tomography, particularly, if a longitudinal section is calculated from a plurality of cross sections by means of computers. A common disadvantage of the computer tomorahpy systems is the relatively high cost. The method of the so-called "indirect tomography" uses images amplifiers in combination with usual tomographic systems in order to amplify the photo intensity of the signals before integration of the images on a film of reduced format. It has been shown that this affords no improvement of the image quality.

U.S. Pat. No. 4,079,417 and the document IEEE TRANSACTIONS ON BIOMEDICAL ENTINEERING (volume BME-26, No. 5, May 1979, pages 253-262) disclose a method for increasing the contrast between image elements laying between a selectable grey value range or, respectively, for contrast increase by flattening of the grey value histogramm. However, these methods are not satisfactory.

SUMMARY OF THE INVENTION

It is the object of the invention to avoid these disadvantages of known tomographic mehtods. It is a further object apparatus and to provide an apparatus for producing tomographic images with improved contrast properties with comparatively little effort, only small radiation amounts are required when recording the images. The present invention is an improvement which solves the above problems an electronic circuit includes an analyzing circuit for contrast comparision of a plurality of original images between image elements neighbouring each other and for statistic interception of the single contrast comparisons. The probability of occurence of contrasts of a certain sign between image elements neighbouring each other is determined in the analyzing circuit by this statistical interception a transformation circuit is provided for correction of original image signals dependent upon the signals obtained from the analyzing circuit. In a circuit image element pairs are selected for further contrast rise. The image element compares the signs of the contrasts corresponding to the signs of maximum probability. The output of this transformation circuit is connected to the image display device. It is, thus, possible to obtain tomographic X-ray images having substantially improved contrast properties, i.e., to substantially reduce the influence of the initially described disturbances or even avoid them totally. The effort is comparatively low because the analyzing circuit necessary and the transformation circuit can be built up from usual elements so that special constructions are substantially unnecessary. Futher, it is possible with the apparatus according to the invention to reduce the X-ray radiation to fluoroscopic doses without any loss of image quality. Thus, the patient and the operating personnel are subject to a reduced load when carrying out the X-ray radiation.

Within the inventive apparatus a repeated contrast comparison takes place in the analyzing circuit, i.e., an analysis of the contrast information of the original images which have been recorded during the tomographic movement of the X-ray apparatus. By means of the repeated contrast comparison, which is done preferably over many original images or, if desired, over all of them, a comparison is made to determine whether a certain contrast occurs repeatedly in th series of original images, particularly in the majority of the original images. When doing this, it is suitable to use the contrasts between image elements in the vicinity of each other, however it would also be clever to make the contrast comparison for example between two image elements each, which are separated from each other by one or more interlocated image elements. This contrast comparison is based on the theoretic realization that the contrasts which belong to the layer being examined, do not change their position and their sign during the tomographic movement which is relatively short. In order to find these "true" contrasts, at first, a comparison of the signs and the position of the contrasts in the original images is made. In connection therewith, it must be realized that the value of the contrast in the orginal image is not quite as significant as the sign of the contrast. If, for example, a certain sign of the contrast repeatedly occurs for a certain image element-pair in all original images or in the clear majority of the available original images, then this contrast positively exists in the layer under examination. The precision of this statistic analysis is higher with growing number of instant images. It has been shown that about 100 instant images are sufficient for obtaining satisfactory results.

In the present invention, subsequent to the statistical interception of the contrast comparisons a transformation of the original images takes place based on the information obtained from the statistical interception of the contrast comparisons. In other words, the original images recorded during the tomographic movement are enhanced by the additional information obtained from the contrast comparisons. It has been shown that the quality of the instant images thereby can be substantially improved by means of comparatively simple circuit elements.

According to a preferred embodiment of the invention the analysing circuit has at least two memories for the separate storage and analysis of the original image signals. These memories are produced during the tomographic movement in at least two sections of this movement crossing each other, preferably in two sections extending perpendicularly to each other. By this division of the tomographic movement into at least two movement sections made in different directions, the statistical analysis of the contrast can be substantially improved. Generally, for expenditure reasons, the movement in two different directions is sufficient, which are preferably perpendicular to each other; however, it would be possible to employ additional movement directions during the tomographic movement. The two directions of the tomographic movement, which in the following are called X- or Y-direction, may, but need not, correspond to the axes of the object. In this connection, it is only of importance that the original images obtained during the movement in X-direction are used for the statistical contrast analysis separately from the original images obtained during the movement in Y-direction, so that two statistical contrast comparisons are independently of each other. The comparisons then may be used in the transformation circuit in combination for improvement of the original image signals. This contributes substantially to an improvement of the image quality by eliminating the influences of other layers not belonging to the layer under examination. It is suitable, to switch off the X-ray source during the transition of the tomographic movement from the X-direction to the Y-direction in order to keep the detrimental influences of the X-radiation as low as possible.

During the transformation of the instant image signals in response to the contrast data obtained by the analysing circuit, (the contrast data in the following are called Kx-values for the X-direction and Ky-values for the Y-direction), the Kx-and KY-values in common are used for a separate improvement of each of the original images. When doing this, the level of any image element of the original image is changed in steps. The step value is always the same and equal to the lowest grey-scale step of the matrix used. The signal level of each image element in question is only increased, but not decreased. According to a further embodiment of the invention, the transformation circuit has a memory for the collective storage of the original image signals, to which memory further memories are associated which store the results of the statistical interception of the contrast comparisons. In this manner, the image elements of each original image are respectively divided into two groups, like the black or white fields of a chess-board, are so stored. Then, according to certain rules the step-wise incremental increase for each image element can be done separately, at first for the image elements of the one group and, subsequently with the thus obtained results for the image elements of the order group. Additional transformation steps are performed as necessary in order to reach a situation in which no image element level cAN be increased more without destruction of the coherent image.

The thus obtained transformed images may already be of considerable diagnostic value, if considered individually. However, it is suitable to integrate the thus obtained, improved instant images and to display the result, for example on a monitor of the image display device.

BRIEF DESCRIPTION OF THE DRAWINGS

FIG. 6 shows the circuit elements necessary for obtaining the Kx-values or Ky-values, respectively;

FIG. 7 shows the circuit elements necessary for improvement of the original images using the Kx-values and the Ky-values;

FIG. 8 shows schematically a detail of the improvement process used in this connection;

FIG. 9 shows a combination of image elements; and

FIG. 10 is an example of the stored Kx-values;

FIG. 11 shows the incremented change of the light level value for a certain image element;

FIGS. 12 and 13 show the the distribution of the light level in five image elements of an image element combination according to FIG. 9 before and after the improvement, respectively;

FIG. 14 shows schematically a possible conflict situation during the examination of the light level distribution in four image elements.

DETAILED DESCRITPION OF THE PREFERRED EMBODIMENT

Figure 4:
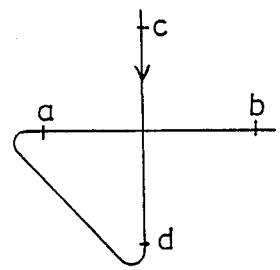
FIG. 4 shows the tomographic movement of the X-ray source.
Figure 5:
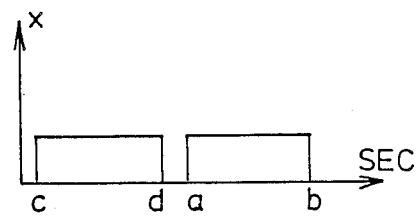
FIG. 5 shows the time diagram of the movement according to FIG.4.

The apparatus comprises a X-ray source 1 (FIG. 1,2,3), with the rays of which the object 2 is examined which lies on a table 2' permeable for the X-rays. Below the table 2' there is positioned in a usual manner a radiation receiver 3 tuned to the X-radiation and being provided with an image amplifier and a television camera. The output of this television camera is connected to an analog-digital-converter 4 of a recording circuit 50, which converter supplies image signals to two random access memories 8, 9, which image signals are digitalized for the single image elements according to the light level of the single image elements. The X-ray source 1 is supplied from a X-ray generator 5 provided with a control means 6 for setting the radiation parameters. Further, means for movement of the X-ray source 1 and of the radiation receiver 3 are provided. These means, not shown in detail, have a movement arm which gives the X-ray source 1 a movement in a plane which is parallel to the table 2', which movmement is shown in FIG. 4 and consists of two sections a-b and c-d crossing each other, preferably being perpendicular to each other. The sequence of these two sections is of no significance. Start and stop of the two movement sections, however, are controlled by a sensor 7 coupled to the movement arm of the X-ray source 1. The output signals of this sensor being fed to a logic circuit 13 of the recording circuit 50. The section a-b of the movement shown in FIG. 4 is called X-section in the following and during carrying out this section X-signals are inserted from the analog-digital converter into the memory 8, whereas the section c-d is the Y-section, during carrying out of which Y-signals are inserted from the converter 4 into the memory 9. Mechanical means typically carrying out the movement cycle shown in FIG. 4 requires about eight seconds. Because a usual television chain produces 15 images per second, the total image number per section a-b or c-d, respectively, is about 70 images. In order to keep the radiation times not needed for image recording as short as possible, it is advisable to accelerate the movement at the transition from the X-section to the Y-section (or viceversa) (see the time diagram shown in FIG. 5). It is sufficient, to record the $2\times70=140$ images designated in the following as instant images, with a fluoroscopic X-ray, doseage or, respectively, with a not much higher doseage so that in comparison to the X-ray rates used in usual tomographic processes a considerable reduction is achieved. The patient and the examination personnel, therefore, are saved.

Figure 3:
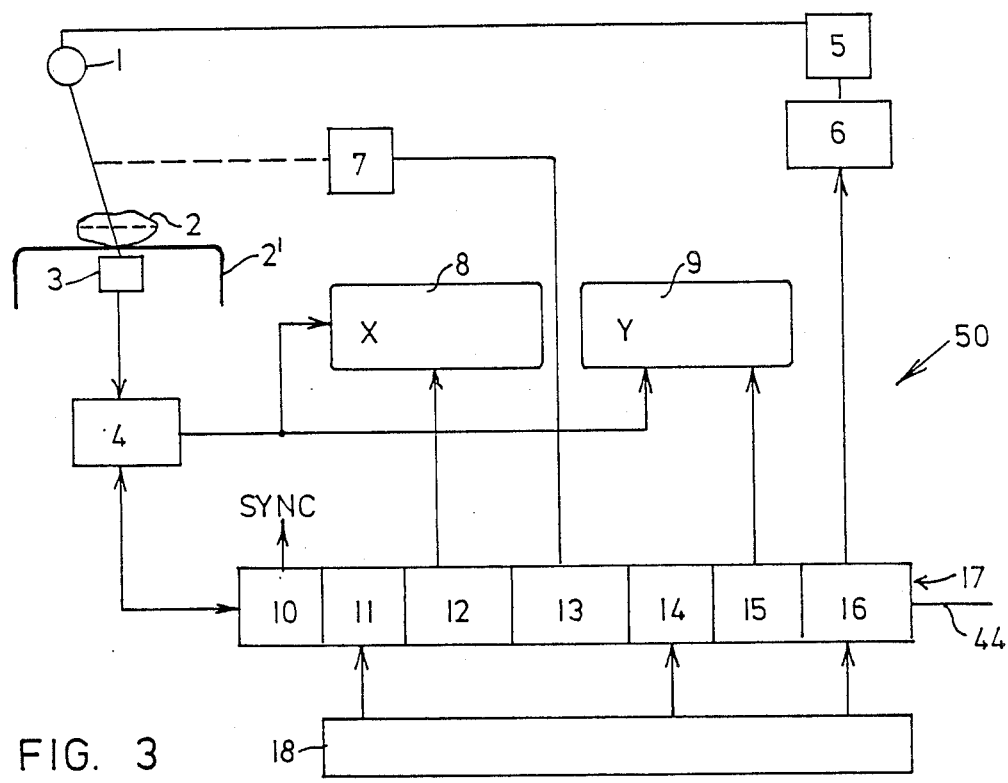
FIG. 3 shows, also in form of a block diagram, the circuit element necessary for obtaining and storing of the original images.

For performing the tomographic X-ray images from the said signals, substantially three main phases of the analysing process are accomplished by means of the recording circuit 50, an analyzing circuit 51 (FIG. 1,2,6) and a transformation circuit 52 (FIG. 1,2,7), namely;

Phase I: This phase is done substantially in the recording circuit 50 (FIG. 3). In this phase the recorded original images are divided according to the two sectors of the tomographic movement.

Figure 1:
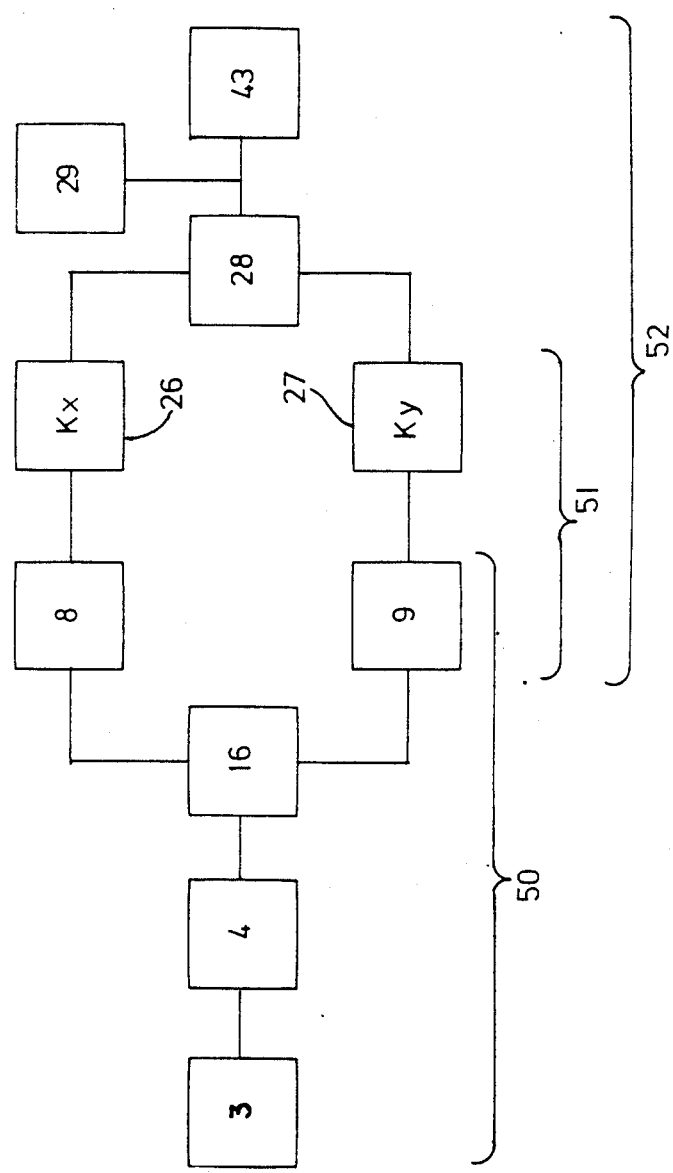
FIG. 1 shows a simplified block diagram of the apparatus.

Phase II: This phase is done substantially in the analyzing circuit 51 (FIG. 1,2,6). In this phase the statistic analysing of the contrasts of image elements neighbouring each other is done in two directions of the scanning movement, which sections are directed perpendicularly to each other.

Phase III: For this phase the transformation circuit 52 (FIG. 1,2, 7) is used. In connection with this, the values obtained in the second phase are used in order to improve all original images recorded in the first phase.

In the first phase the digital image signals obtained from the converter 4 are recorded in the memories 8 and 9, respectively, separately for the X- or Y-sections, respectively. This separation is controlled from a logic circuit 13 connected to a common main line 44 (BUS) together with further logic circuits 10, 11, 12, 14, 15, 16 of a processor 17. The logic circuit 10 is built up as a synchronous generator which synchronizes the analog-digital-converter 4 or the video signals produced by it, respectively, with the address signals, delivered from the logic circuits 12, 15 to the two memories 8 or 9, respectively. The processor 17 is controlled from an operator desk 18, by means of which the image number for the two sections a-b or c-d, respectively, (FIG. 4) of the tomographic movement can be selected in correspondence with the given exposure time of the tomographic movement device. This data is stored in the logic circuit 11. In response to the image number, the operator sets a limit value PFL for the probability factor which is needed in the logic circuit 14 for a transformation process described later in detail. The logic circuit 16 is built up as a start circuit by means of which the start of the exposure and therefore of the image recording process for the original images is initiated from the operator desk 18. Via the common BUS-line 44 the logic circuit 16 cooperates with the logic circuits 10 and 13 for producing the synchronous signals and for interception of the movement steps of the tomographic movement.

As soon as recording of the X-signals and of the Y-signals of the instant images in the memories 8 or 9 respectively, is terminated, in the analysing circuit 51 (FIG. 1,2,6) as the first analyzing process the characteristic values Kx-, Ky associated with the single elements of the instant images are obtained. In order to reduce the expenditure, the analyzing circuit 51 suitably has some circuit elements which are also elements of the recording circuit 50, for example the memories 8 and 9. It is also possible to obtain the characteristic values Kx and Ky simultanously with the recording of the X- or Y-signals, respectively. However for better clearness and for simplification of the circuit, it is preferable to separate these process steps.

The image signals of the X- or Y-sections, respectively of the original images stored in the memories 8 and 9, respectively, are subject separately for each of these sections for four processes designated in the following by (a) to (d):

(a) At first for each image element pair the positive or negative constrast difference of two neighbouring image elements in the X-section of the movement according to FIG. 4 is determined in the analyzing circuit 51. In this connection, the contrast difference is defined as the level difference of the light level of electrical signals corresponding to image element pairs. Independently from the magnitude of the contrast difference, however, only the sign, that means + or − is stored. This is better explained with reference to FIG. 9 which shows a cross-shaped configuration of five image elements of any desired digital image. With reference to the central image element A there exist four contrasts, namely two in x-direction and two in y-direction. These contrast are: BA, AC, DA, AE. Each of these contrasts can have thee sign + or −, which depends from the level values of the corresponding image elements. Suitably, the definition of these signs is so chosen tha the sign + for BA means that A>B. The sign + for AC means that C>A. Correspondingly, + means for DA that A>D and for AE that E>A. Correspondingly means - for BA that B>A; for AC that A>C; for DA that D>A and for AE that >E. Such a selection of the signs of the contrasts is suitable if the recording direction or reading, respectively, of the image elements is done in the usual manner, namely from the left hand image side to the right hand image side for the constrasts in x-direction and from the upper image section to the lower image section for the contrasts in y-direction (FIG. 4).

(b) Then the contrast differences belonging to the same sign are counted for always the same image element pairs of all images. In other words, for all image elements that image number is determined in which for a certain image element pair there occurs always the same sign of the contrast difference. The two values N+ and N− are obtained.

(c) By subtraction (N+)−(N−) the value PF is obtained which plays the roll of a probalility factor for the contrast belonging to a certain image element pair.

(d) At least the PF-values obtained for the single image element pairs are compared with the earlier mentioned pre-fixed limit value PFL, playing the roll of a percentage with which each contrast in question must occur in the original images in order to be valid. If the positive or negative PF-value obtained by process (c) exceeds the limit value PFL, the corresponding sign is stored as Kx-value or Ky-value, respectively.

In the analyzing circuit 51 the obtained Kx-values are stored in the memory 26 (FIG. 2,6) the Ky-values are stored in the memory 27. When doing this, the X- or Y-signals, respectively, serving for obtaining the Kx- or Ky-values, respectively, are interrogated by the memories 8 or 9, respectively. A register 19 (FIG. 2,6) synchronized by the synchronization logic circuit 10 addresses the image elements to the memories 8 or 9, respectively and the value of each image element level in question is stored in the contrast detector 20. There, this value is stored for a time for getting the analogous value of the further image element to be compared with the image element in question, particularly of the neighbouring image element. In a comparison circuit 21 then the comparison corresponding to the above mentioned process (a) is made and the result is stored in a random access memory 25 which constitutes a one-image matrix. The results of the level comparison are stored at the address A of the memory 25 by +1, if the level of A was greater than the level B, and are stored by −1, if the level of A was smaller than the level of B. For level A=level B no storage is made so that the corresponding memory places remain vacant.

The storage of the signs for the purpose of their statistical analysis suitably is done according to the following rule: The contrast sign of the image element pair BA (FIG. 9) is stored at the address A; the contrast sign of the image element pair AC is stored at the address C; the contrast sign of the image element pair DA is stored at the address A; the contrast sign of the image element pair AE is stored at the address E. Therefore, at the address A two different informations are recorded in the example taken. The best solution therefore is the use of two separate random access memories, the one of these memories being used only for recording the contrasts measured in x-direction whereas the other memory is used for recording of the contrasts measured in y-direction.

The level of the image element A corresponding to the next original image and the analogous next level of the image element B give a repetition of this comparison process, the result being summarized with the earlier done subtraction process in an integrator 22 connected to the memory 25. The integrator 27, therefore, can show for the image element under question (for example A) the values +2, +1, 0, −1 or −2 after two comparison processes made in the comparison circuit 21. The result is stored in a further random access memory 26 at the address A, which memory constitute a one-image matrix. In an analogous manner then the contrast signal associated to the same element of the third original image (delivered from memory 8 or 9, respectively) is determined in the comparison circuit 21 and is summarized with the value stored at the same time in memory 26. The result is stored in the memory 25. The contrast detector 20, the comparison circuit 21 and the integrator 23 operate further in the described manner for all instant images, the values occuring earlier in the memories 25 and 26 (for the X-values) or 27 (for the Y-values), respectively, are currently replaced by new values. The described integration of the contrast signals can also be made by means of one single random access memory matrix only, however, the described embodiment operates faster.

As soon as in the described manner the above mentioned processes (a), (b) and (c) are terminated for all 70 original images of the X-section of the recording, the last PF-value is stored in the memory 26. The logic circuit 16 (FIG. 2) which has a timing-function, starts now the logic circuit 14 in which the earlier mentioned limit value PFL was stored. The last values of PF are now again inserted in the memory 26 and are compared in a further comparison circuit 23 with the pre-fixed PFL-value. All values which are smaller than PFL are then removed from the memory 26. The remaining values remain in the memory 26 and constitute there the Kx-values (FIG. 10). A Kx-sign in position A (see FIG. 9) means the contrast between the image elements B and A. The Y-sections of the original images in are treated in similar manner. In this connection, the contrast comparison between neighbouring image elements is done in the direction of the Y-scanning of the object (FIG. 4) so that, for example, the comparison between the light levels of the image elements D and A (FIG. 9) is made if the addressing in FIG. 9 is made from above to below. The stored values remaining in the memory 27 constitute the Ky-values.

The Kx-values or Ky-values remaining in the memory 26 or 27, respectively, may be positive or negative. The number of the Kx-values or Ky-values, respectively, depends for a given object from the PFL-value pre-selected by the operator. Lower limit values PFL result in more Kx- or Ky-values, respectively. On the contrary, higher PFL-limit values result in less Kx- or Ky-storages in the memories 26 or 27, respectively, however the information then is more reliable. In practice a compromise for a certain type of object is easy to find.

The contrast values stored in the described manner in the memories 26, 27 at the end of the phase II are used later on in the phase III for improvement of the instant images in a manner described more in detail later on. FIG. 10 shows an example of the scattered distribution of the positive and negative contrasts, this example for simplification purposes is chosen for a very small matrix of 25 image elements (5×5).

However, it is easy to be seen that the final sign distribution in a very great matrix (for example in a matrix of 512×512 image elements used in practice) will be similar. FIG. 10 in this connection is so to be understood that this Figure shows the distribution of the Kx-contrasts alone (or the distribution of the Ky-contrasts alone).

After completion of these steps the logic circuit 16 which controls the timing actions, starts the next process step (phase III). In this connection the transformation circuit 52 is used which is shown in detail in FIG. 2 and 7. This transformation circuit 52 uses the two memories 8, 9 in which the X-sections of the original images or the Y-sections thereof, respectively, are stored, and further the two memories 26, 27 in which the Kx-values or the Ky-values, respectively, of the heretofore described process step are stored. This data is used in order to transform each instant image for itself Within this transformation, contradictions between the stored data are avoided. Such a contradiction is shown in FIG. 14. If there results from the stored values that R=S and S=W, and if further R>T and T>W, then there is obviously a contradiction between the stored values for R and W. For avoiding such contradictions in the digital image scanning occuring unavoidably in practice, the image elements of the image matrix which are stored in the memories 8 or 9, respectively, are divided into two separate groups I, II, as this is shown in FIG. 8 for a 5×5 matrix with 25 image element addresses A to Y. In this connection, the distribution is done such that the single image element informations are alternatively divided up into the two groups which in common always represent a single image. These two image element groups according to FIG. 8 are alternatively transformed, such that contradictions in the information associated to the single image elements are eliminated. This is done such that the values of the single image elements are incrementally changed so that the corresponding image remains coherent and the instant image is improved. Therefore, before each incremental increase of the level of an image element, the image is checked with respect to continuity i.e. contradictions in the total information of the image. Suitably, this is done so that for each image element, the contrasts with the two neighbouring image elements in horizontal and in vertical direction are checked (FIG. 9), if desired, considering the Kx- or Ky-information, respectively. The next incremental level increase of the image element under consideration occurs only if the continuity of the image is conserved. The level of an image element which cannot increase more, is in the "blocked" status which is reached for all image elements after a certain number of transformation steps. In this manner an improved instant image is obtained from the original status of the original image.

The improvement of each image element in this connection is done in several steps, always in comparison with the constant values which have beed determined in the last, completed transformation step. In the first step, the image transformation refers only to the information contained in the image elements of the first image group I (FIG. 8). comparing the associated original image and the Kx- and Ky-values. The second transformation step refers to the image elements of the second group II (FIG. 8) and transforms these, considering the values of the first group obtained by the preceding transformations. In the third step, the first group is transformed again, considering the just obtained values of the second group, and so on.

Therefore, multiple repeated repetitions of incremental transformation of both image groups associated with each instant image is done, always considering the Kx-values and the ky-values. Within this, the light level of the single image element is increased in steps according to rules later described in detail, until this level reaches a predetermined maximum M, which is shown in FIG. 11 for the image element A. In this connection, the ordinate gives the light level L of the image element, the abscissa the time t. The height of the step of this incremental increase corresponds to the height of the steps of the greyscale of the matrix in use, and therefore is comparatively low. This use of a small step height is favourable when eliminating erratic contrasts in the images when considering the contrast configuration around the image element under consideration during each transformation step.

Figure 2:
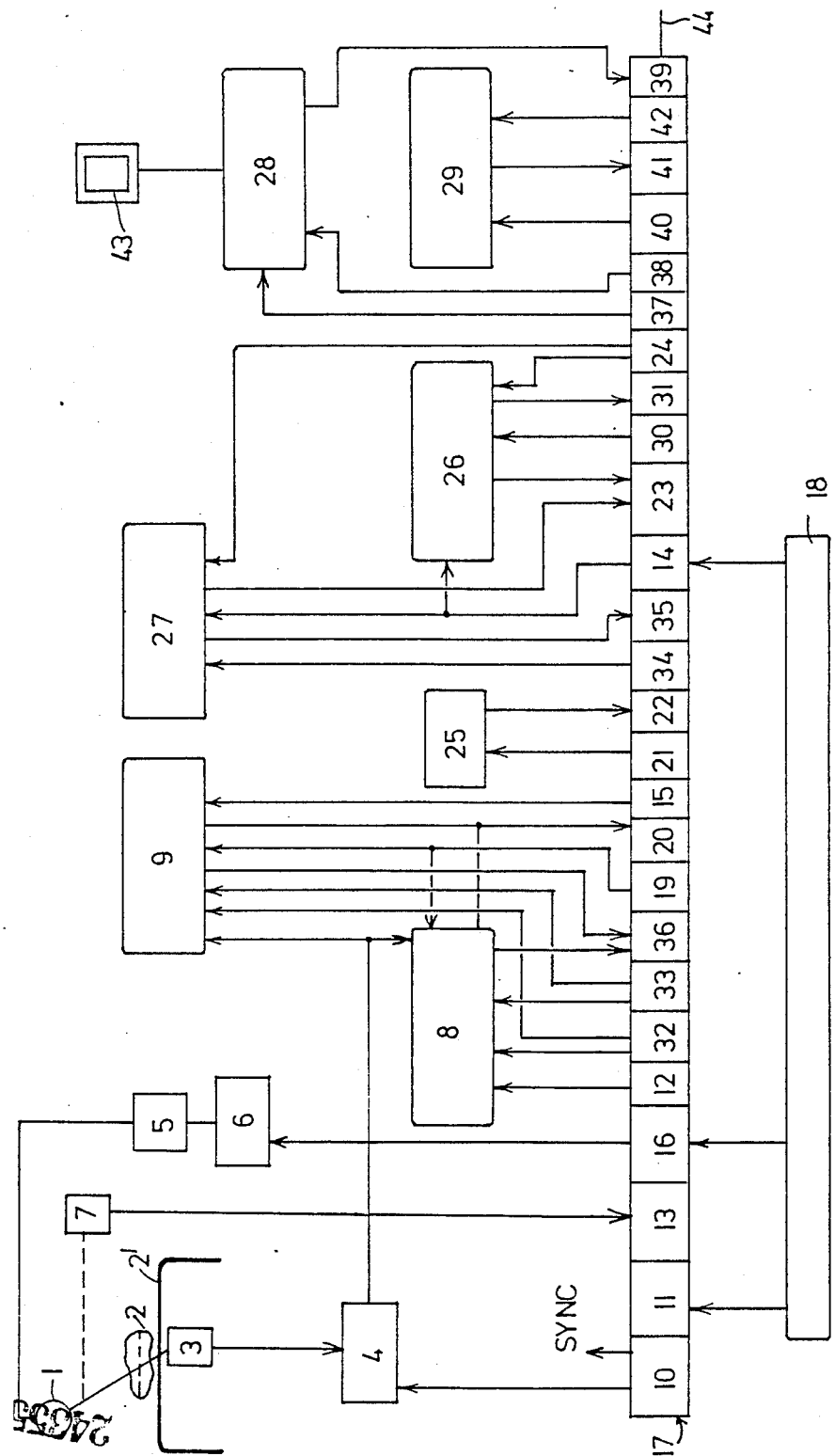
FIG. 2 is a detailed block diagram.

In consideration of the contrast configuration around the image element under consideration (for example A in FIG. 9) or for determining the new light levels of this image element, respectively, 14 readings are used. At first the light levels in the image elements A, B, C, D, E in the corresponding original image, further the light levels of the analogous image elements in each image obtained by the last transformation step, and lastly the four Kx- and Ky-sign values for the contrasts of the image element pairs AB, AC, AD and AE. For doing this, the first named five readings are obtained from the memories 8, 9 (FIG. 2,7). The further named five readings from the random access memory 28 constituting a one-image matrix, and the last named four informations from the memories 26, 27. In operation, processor moduli 31, 35, 36, 39 are provided which are so programmed that the 14 readings for each image element are compared with each other. In dependence of this comparison, it is detemined whether the next incremental increase of the light level of the adjoining image element under consideration (for example A) according to the rules later explained in detail is taken or not.

In the starting phase of the transformation process the light level of all image elements of the two groups is increased without consideration of the contrast configuration, in order to adapt the transformation to the constant light level of the maximum of the greyscale-section of the matrix in use. This starting phase ends, as soon as at least one image element reaches this light level during a certain transformation step, then a phase of level equalization and contrast improvement starts. The incremental change of the level of single image elements in this connection is affected by the step generator 87. An integrator 38 integrates the level of the image element just under consideration occuring in the module 36 with the one-step-signal generated by the step generator 37 and inserts the new value into the memory 28. In this connection, the integrator 38 has a set threshold value corresponding to the maximum value of the greyscale region of the matrix in use. As soon as this limit value is reached, the second phase is started by consecutive reading of the content of the memories 8, 9, 26, 27 and 28, always separately for one of the two image groups (FIG. 8) and for a cross-wide neigbouring configuration of the image elements under question according to FIG. 9. In this second phase, the levels of the image elements of the instant images are incrementally increased according to the following rules, and this alternatively for the image elements of the one and those of the other group.

The above mentioned rules for the incremental level increase are the following: The level of the image element A is always increased for one step, except for the following three cases:

(a) The level of the image element A has reached the maximum of the greyscale range of the matrix. This limitation of the light level is final, that means there is no further increase of the level of the image element under consideration.

(b) The level of the image element A under consideration is greater than the level of each of the four adjoining image elements B, C, D, E. In this case, there is a blocking of the light increase of the image element A only for the transformation step under consideration and this blocking can be cancelled at the next transformation step.

(c) One of the image elements B, C, D, E neighbouring the image element A under consideration, for example the image element D, is already finally blocked, for example according to case (a), above and the sign of the contrast AB indicates that A<B and this sign is confirmed by the original picture and corresponds with the sign of Kx for the AB-position. This blocking of the level is final.

Of course, the other image elements corresponding to the instant image are treated accordingly. In the FIG. 12 and 13 the light levels of always three adjoining examined image elements are shown before the transformation (upper part of FIG. 12) and after the transformation (lower part of FIG. 12) with reference to an image element configuration according to FIG. 9. It is assumed that a Kx has been found in position BA (namely A>B) and that no Kx is in position AC. For FIG. 13 it is assumed that there are no Ky in positions DA and AE.

In the described second phase the address registers 30, 32, 34 and the step generator 37 address the single elements for each of the two groups shown in FIG. 8 and additionally the image elments B, C, D, E (FIG. 9) positioned around the image element A just under consideration. This double address system is shown in FIG. 7 only for the two memories 8 and 9, 33 being an additional address module. The transformation of the image under consideration ends as soon as all image elements of the corresponding image are blocked. Then the next image is transformed in the same manner. The completely transformed 140 images are recorded in a further random access memory 29 (FIG. 2,7). The address process is done in the manner usual when recording television images by means of an address module 42. The module 41 constitutes an integrator of known construction.

Within the small matrix shown the FIG. 8 of in total 25 image elements the left hand part (I) corresponds to the memory 29 and the right hand part (II) to the memory 28.

The use of two separate matrix-memories is essential with respect to the operation of the apparatus in the third phase III of the image transformation. When changing an image or even only a small part of an image by use of new contrast values difficulties occur if usual methods are used for this purpose, because then a new contrast value constitutes a discontinuity of the image or forces to a change of all contrast values of the image, which obviously results in an image which deviates substantially from the original image and therefore is of no use for the tomography in which an image of a selective position is substantial. Further, the introduction of the new contrast value together with unavoidable new image element values would easily result in contradictions between contrasts and the associated level-values. In order to avoid these difficulties the described transformation (phase III) is used.

FIG. 8 shows the distribution of the image elements is done in a manner simmilar to the disposal of the white or black fields of a chessboard (black fields for example respresented by part I of FIG. 8, white fields for example represented by part II of FIG. 8). In this connection, the matrix I is addressed by means of a usual address program suitable for the memory so that after the address A the address C, E, G, I, K and so on follow. In an analogous manner the matrix II is addressed in the sequence B, D, F, H, J and so on. It is of importance that the just addressed image element in the matrix concerned is neighboured only by free image elements in the two x-directions and in the two y-directions. Such a distribution of the level-values represents an image without direct connection to the original contrasts contained in the original image. It can be concluded therefrom that each change of each of these levels in such an arrangement is not detrimental for the continuity of the image. Obviously an image of this kind per se has no practical value. It is used in connection with the described process only as a means for the transformation of the complete image which is formed by all image elements stored in the matrix I as well in the matrix II (FIG. 8).

The transformation process is explained in further detail for an image element, for example for the image element M. In order to avoid that the constant value of the image element M must be changed in both directions (at first as a rise and then as a fall, if the rise is not compatible with the continuity of the image), the described incremental rise of the image element level is used. This allows one to increase the image element level M to the value M+1, wherein 1 is the step height which should be chosen as low as possible. This increase of the level, however, is made only if certain conditions are fullfilled (see the three preceding described exceptions a, b, c). These conditions contain necessarily the Kx- and Ky-signs (if present) between the image element pairs LM, MN, HM and MR (FIG. 8, matrix I) such that the increase of the M-level is allowed only under the condition that the introduced change does not decrease the contrast in the Kx-position (or Ky-position, respectively). The contrast sign Kx (or Ky) is valid for this condition only in the case that the contrast sign is confirmed by the instant image being under transformation. On the other hand each increase of the M-level is allowed if its consequence is an increase of the contrast in the positon of Kx (or Ky) itself. In this manner an amplification (or a gain) of th "true" contrasts is achieved. The preceding described conditions (see earlier under (a), (b), (c)) have practical influence upon the start and the stop of the transformation process.

The incremental changes are made for all image elements or the corresponding light levels, respectively, of the matrix I under the same conditions. The new level values are recorded by means of an additional memory and are used as reference values in the next step of the transformation when the image element levels of the matrix II are changed. If in this matrix the image element N is considered, the following contrasts are used for checking of the conditions for the increase to N+1: M'N, NO', I', NS'. The level values M', O', I' and S' are now different when compared to the levels associated earlier with the image elements M, O, I, S, because these values in the matrix I have just been changed (if the described conditions are fulfilled). Of course not all of these levels must be increased for +1, if the conditions are not fulfilled. It can be assumed, however, that the number of the blocked values in an earlier step of the transformation process usually is not great because for stopping the level increase of the image element in question the substantial influence is the danger of an incontinuity of the resulting image and this occurs only in case of an incorrect position of a certain Kx or Ky (contradiction in the position of the contrasts). Such incorrect signs or positions of Kx or Ky are not likely, because the second main stage of the process (phase II) by which the Kx- and Ky-values are found, is sensitive enough. On the other hand the image is never destroyed to discontinuity by applying the transformation steps used within the stage III. A certain incorrect Kx or Ky leads only to an early blocking of the level values and to a stop of the phase III. The transformation of the next images of the 80 instant images (from phase I) may even prove that the Kx or Ky uder consideration is a true value (confirmed by sign and position in the certain instant image being under transformation) and the images obtained can show a high level of the contrast resolution of the layer imaging.

In FIG. 14 the position for a contrast conflict have been shown. The equations R=S, S=W, R>T and T>W added to FIG. 14 are so to understood that there is no Kx in the position RS and there is no Ky in the position SW, however, that there exists a minus-Kx in the position TW and plus-Ky in the position RT. The conflict is then unavoidable, because the level of T at the same time cannot be higher and lower than R=S=T. Therefore in reality one of the contrasts Kx or Ky must be not true or there must be present a contrast for the position RS or SW. However, as described above, the transformation process according to phase III serves for eliminating the influences of such conflict positions at least partially.

FIG. 11 shows, by way of an example, the sequence of the stepwise changes (increases) of the level value of a certain image element. Each step is associated to a transformation step of the image element, which transformation step is contained in one of the two matrices I or II, respectively (FIG. 8). The level M illustrates the last value in the blocked status, when no further increase is possible according to the above mentioned conditions (a), (b), (c). The longer steps represent that the level value may remain constant for two subsequent transformation stages. This can be explained by the fact that the level values BCDE around any desired image element A (cross position according to FIG. 9) can reach values in two stages which fulfill the conditions for a level increase A, which was not yet the case after one single step. This means also that the increase conditions for any image element must be always checked during all transformation stages, independent from a blocking of the level value for a time.

The result of the stepwise change of the value of an image element is shown in FIG. 12 and 13 with respect to the thereby achieved improvement of the contrast. The upper part of FIG. 12 shows for example the initial level value distribution for the image elements B, A, C in FIG. 9, therefore for three image elements disposed in X-direction adjoinig each other. It is assumed that for the image element pair BA a Kx would be present, the sign of which would be +, that means the A>B. It is further assumed that for the position AC no Kx would be present. The result of the transformation (simplified) is shown in the lower part of FIG. 12. Is shown an increase of the BA-contrast and a total suppression of the contrast AC so that this contrast does not appear in the layer being just under examination.

FIG. 13 shows similar conditions for the Y-direction. It should be assumed that for the BA-positon as well for the AE-position no Ky is present. The resulting, transformed image shows a total suppression of the two contrasts because these contrasts do not belong to the examined layer according to the realisations.

To the memory 28 a monitor 43 is connected on which all currently transformed images and, if desired, also the transformation phases and transformation steps can be seen. The single transformed images can already admit diagnostic statements, however it is suitable to integrate all the 140 images in order to fully evaluate all information contained in the original images. This integration is done in the module 41, the result can be made visible in the monitor 42.

Numerous modifications of the described apparatus are possible, for example:

The crosswise disposed image element combination according to FIG. 9 can be replaced by a combination having more image elements, for example a crosswise image element combination having nine image elements. Further it is possible not to determine the contrast conditions between immediately adjoining image elements, but with respect to image elements being more spaced from each other, for example the first and the first third image element and so on. This way particularly then is advisable if a big matrix should be resolved.

Further it is possible to calculate one or more tomographic cross sections from the images associated to many tomographic longitudinal sections. Suitable apparatus for this purpose are known.

Further it may be suitable to use the known methods according to which a section image is reconstructed from numerous images corresponding to projections in which the main beam is always perpendicular screen of the image amplifier, in order to avoid geometric distortions.

As already mentioned, it is possible within the scope of the invention, to add to the described movement directions of the tomographic movement crossing. each other one or more further movement directions in addition. Generally, however, the two-component-movement is sufficient.

What is claimed is:

1. An apparatus for obtaining tomographic X-ray images having improved contrast properties including:
    an X-ray source for passing radiation through an element;
    a receiver for receiving the radiation of the X-ray source after the radiation has passed through the element;
    mechanical means for producing tomographic relative movement between the receiver and the X-ray source during radiation;
    an image converter for producng electrical image signals of original corresponding element-by-element to the X-radiation received by the receiver;
    an electronic circuit for conducting said electrical image signals to an image display device and for statistical calculation of contrast comparisons, said electronic circuit including an analyzing circuit for contrast comparison repeated over a plurality of original images between neighboring image elements and for determining the probability of occurence of particular signs of contrasts between neighboring image elements using the results of the statistical calculation;
    a transformation circuit for varying the original image singals in dependence on the signals obtained from analyzing circuit and for selecting pairs of image elements for further contrast increase for which pairs the signs of the contrasts correspond to the signs of contrast of maximum probability; and
    the output of the transformation circuit being connected to the image display device.

2. The apparatus according to claim 1 wherein the image display device comprises a monitor.

3. The apparatus according to claim 1 wherein the analyzing circuit comprises means repeating contrast comparison over a majority of orignnal images.

4. The apparatus according to claim 1 wherein the image elements for contrast comparison by the analyzing circuit are adjoining each other.

5. The apparatus according to claim 1 wherein the analyzing circuit includes at least two memories for the separate storage and analysis of the original image signals produced during tomographic movement in at least two sections of movement crossing each other.

6. The apparatus according to claim 5 wherein the two sections of movement extend perpendicular to each other.

7. The apparatus according to claim 1 wherein the analyzing circuit comprises an intergration stage for the contrast comparisons of all images.

8. The apparatus according to claim 1 wherein the analyzing circuit further comprises a threshold value stage for considering a threshold value for the statistical calculation of the contrast comparisons.

9. The apparatus according to claim 8 wherein the threshold value is set on an operating desk.

10. The apparatus according to claim 1 wherein the analyzing circuit has two memories which store the results of the statistical calculation of the contrast comparisons, a further memory of the transformation circuit associated with each memory, said further memory collectively storing the transformed image element values, said values determined by the results of the contrast comparisons.

11. The apparatus according to claim 10 further comprising a step generator for increasing the light level of the image elements of the original signals incrementally by means of an integrator.

12. The apparatus according to claim 1 further comprising a recording circuit including two random access memories for receiving digitalized original image signals, said memories separated for two movement directions of the X-ray source, a processor connecting said memories to the analyzing circuit, said processor for setting a limit value from an operating desk, the analyzing circuit comprising a further memory for performing the contrast comparison and an integrator, the output signals being stored in two aditional memories after comparison with the limit value, the transformation circuit comprisng a first and a second further memory, said first further memory connected to the processor, a step generator and to an integrator of the processor, said second further memory being connected to moduli of the processor and wherein the image display device is connected to the first further memory connected to the step generator.

* * * * *

UNITED STATES PATENT AND TRADEMARK OFFICE
CERTIFICATE OF CORRECTION

PATENT NO. : 4,939,758
DATED : July 3, 1990
INVENTOR(S) : KURT NOWAK

It is certified that error appears in the above-identified patent and that said Letters Patent is hereby corrected as shown below:

On the cover page, after "[73] Assignee:" please change "Art Bickford & Co.," to --Art Bickford & Co. Gesellschaft m.b.H.--

On the cover page, after the name of the Assignee, please change "Weiner" to --Wiener--

Signed and Sealed this

Fifth Day of November, 1991

*Attest:*

HARRY F. MANBECK, JR.

*Attesting Officer*     *Commissioner of Patents and Trademarks*